United States Patent [19]

De Monclin

[11] Patent Number: 5,147,003
[45] Date of Patent: Sep. 15, 1992

[54] COMPOSITE ROAD VEHICLE WITH ELECTRIC AND THERMAL PROPULSION MEANS

[75] Inventor: Bruno De Monclin, Paris, France
[73] Assignee: Societe Dite Sita, Paris, France
[21] Appl. No.: 790,781
[22] Filed: Nov. 4, 1991

Related U.S. Application Data

[63] Continuation of Ser. No. 530,796, May 30, 1990, abandoned.

[30] Foreign Application Priority Data

Oct. 26, 1989 [FR] France ................... 89 14030

[51] Int. Cl.$^5$ ............................................. B62D 59/04
[52] U.S. Cl. ................................. 180/14.2; 180/65.2; 280/423.1; 298/8 R
[58] Field of Search ..................... 180/14.2, 65.1, 65.2, 180/65.3, 65.4, 65.7, 65.8, 243, 247, 14.1; 298/8 R, 8 H; 280/423.1

[56] References Cited

U.S. PATENT DOCUMENTS

| | | | |
|---|---|---|---|
| 3,502,165 | 3/1970 | Matsukata | 180/23 |
| 3,888,325 | 6/1975 | Reinbeck | 180/65.2 |
| 4,042,056 | 8/1977 | Horwinski | 180/65.2 |
| 4,165,795 | 8/1979 | Lynch et al. | 180/65.2 |
| 4,180,138 | 12/1979 | Shea | 180/243 X |
| 4,269,280 | 5/1981 | Rosen | 180/65.2 X |
| 4,351,405 | 9/1982 | Fields et al. | 180/65.2 |
| 4,368,795 | 1/1983 | Tidwell | 180/65.2 X |
| 4,400,997 | 8/1983 | Fiala | 180/65.2 X |
| 4,470,476 | 9/1984 | Hunt | 180/65.2 |
| 4,562,894 | 1/1986 | Yang | 180/65.2 |
| 4,676,330 | 6/1987 | Roberts | 180/14.2 |
| 4,697,660 | 10/1987 | Wu et al. | 180/65.2 |
| 4,762,191 | 8/1988 | Hagin et al. | 180/14.2 |
| 4,923,025 | 5/1990 | Ellers | 180/65.2 |

FOREIGN PATENT DOCUMENTS

| | | | |
|---|---|---|---|
| 0041111 | 11/1981 | European Pat. Off. | |
| 1430605 | 11/1968 | Fed. Rep. of Germany | 180/14.2 |
| 3739919 | 6/1989 | Fed. Rep. of Germany | |
| 2071032 | 9/1981 | United Kingdom | |
| 2196912 | 5/1988 | United Kingdom | 180/65.2 |

OTHER PUBLICATIONS

Thompson, "Advanced Electronic Control Systems for Electric Vehicles" Sep. 1976 pp. 20–22 Proceedings of the ICAEEV.
Radley et al., Popular Science Oct. 1987 p. 16
Thomas, "Some Hybrid Propulsion Systems for Road Vehicles" Feb. 1977 p. 125 Electronics & Power.

*Primary Examiner*—Charles A. Marmor
*Assistant Examiner*—Kevin Hurley
*Attorney, Agent, or Firm*—Oliff & Berridge

[57] ABSTRACT

A transport method is disclosed wherein relatively slow displacements with frequent stops and relatively rapid displacements with few stops may be efficiently performed with the same vehicle or the same vehicle unit. The slow displacements are made by means of one or more electric batteries and the rapid displacements are made by means of one or more thermal engines.

11 Claims, 2 Drawing Sheets

COMPOSITE ROAD VEHICLE WITH ELECTRIC AND THERMAL PROPULSION MEANS

This is a Continuation of application Ser. No. 07/530,796 filed May 30, 1990, now abandoned.

BACKGROUND OF THE INVENTION

The invention relates to a method of differentiated transports of materials and/or persons, i.e. transports during which the conditions of speed, stopping frequency, distance, noise and other factors vary substantially. It also relates to a new type of vehicle or vehicle unit for providing such transports.

The requirements of industrial life often lead to certain transports being made by vehicles under distinctly differentiated conditions. Thus, for example, there is a need to distribute or collect materials or goods in more or less densely inhabited streets after they have come from relatively far away, particularly from a suburb or the country. Such is the case for the delivery of goods to town distributors, or the case of the collection of household or other waste in inhabited areas, when the goods come from factories, stations, ports or other sources distant by many kilometers from the places where they are distributed. Similarly, when it is a question of removing rubbish from an urban area, the rubbish tip is often very far away. Now, in inhabited areas the transporter is forced to move at a moderate speed with frequent stops. Furthermore, for obvious reasons, he must make as little noise as possible, especially early or late in the day, and reduce pollution to a minimum. In addition, it is desirable not to exhaust batteries for going to and from the distant source of the goods or rubbish tip.

Thus, the transports in question comprise two differentiated phases: a first phase of distributing or collecting at a low speed and in silence without troublesome pollution, and a second phase at normal or rapid speed between this working zone and the source of goods or rubbish tip.

The modes of transport and vehicles used at the present time are ill suited to the above described differentiated operations. Thus, for example, the usual distribution of bottles of drinks to the retailers of an urban area by diesel trucks causes troublesome noise and pollution. It is the same for collecting rubbish, where the power of the engine can in no way accelerate the work which requires continual steps.

SUMMARY OF THE INVENTION

The present invention brings a considerable improvement to differentiated transports. It makes it possible to carry out the slow phase, i.e. that of distributing or collecting, practically without noise or pollution, and the rapid phase, namely travel to the sources or to the rubbish tip of the transported materials, under the desired conditions of speed and efficiency.

The transport method of the invention is characterized in that with the same vehicle or vehicle unit, the slow travel, comprising frequent stops, is provided by electric means, whereas the rapid phase, comprising no stops for distributing or collecting, is provided by traction using a thermal engine. Thus, the vehicle or vehicle unit, intended for the differentiated transports in accordance with the invention, comprises at least one electric motor and at least one thermal engine, and controls for operating or stopping the motor and engine.

Preferably, the power of the electric motor is calculated for driving the vehicle at maximum load at a moderate speed, for example from 10 to 50 km/hour, and especially 20 to 40 km/hour, compatible with distributing or collecting materials in an urban area. On the other hand, the thermal engine, an explosion or internal combustion engine, is preferably more powerful, so as to be able to drive the vehicle at maximum load at a usual road speed particularly between 60 and 120 km/hour.

A particularly practical embodiment of the invention consists in using a thermal engine tractor, capable of transporting the desired weight over numerous kilometers at a speed of 60 to 90 km/hour, and a trailer or semi-trailer equipped with an electric motor which can cause its load and the tractor to run at a moderate speed, particularly from 10 to 50 km/hour. With the trailer hitched to the tractor, the invention leads to an original solution in that, during distribution of the goods or during collection of materials in an urban area with slow displacements and numerous stops, the electric motor of the trailer or semi-trailer not only drive the latter with its load but also provide running of the tractor.

The thermal engine of the tractor is started up with the electric motor stopped, when the distribution or collection is finished and when leaving the urban area, for driving the trailer rapidly towards a source of new goods or to a rubbish tip for the collected materials. Thus, for example, in the case of household waste, the collection in an electrically driven semitrailer may take place silently, without pollution, at any time of day or night, whereas this trailer may be brought to a rubbish tip situated several kilometers away very rapidly through driving by the thermal engine tractor.

Even when the electric motor and thermal engine are mounted on the same vehicle, they are connected to different axles. They could possibly, if required, be used simultaneously and stopped independently of each other.

The vehicles used for carrying out the invention may be of varied types and powers. It is, however, preferable to provide electric traction with motor(s) of a power of about 15 to 50 kW, or better still from 20 to 40 kW, the power of the thermal engine(s) being from 100 to 300 hp (74 to 224 kW). Thus, contrary to the known hybrid vehicles having both a thermal engine and an electric motor of substantially the same power, the vehicles in accordance with the invention do not have the drawback of having to transport a very great weight of electric batteries, because the power of their electric traction is relatively smaller. The preferred ratio of the electric power to that of the thermal engine(s) is 1/10 to 1/2, and especially 1/6 to ⅓.

The invention is illustrated by the following description of a particular embodiment, which is in no way limitative.

BRIEF DESCRIPTION OF THE DRAWINGS

The preferred embodiments of the invention are described with reference to the drawings in which.

DESCRIPTION OF THE PREFERRED EMBODIMENTS

Figure 1:
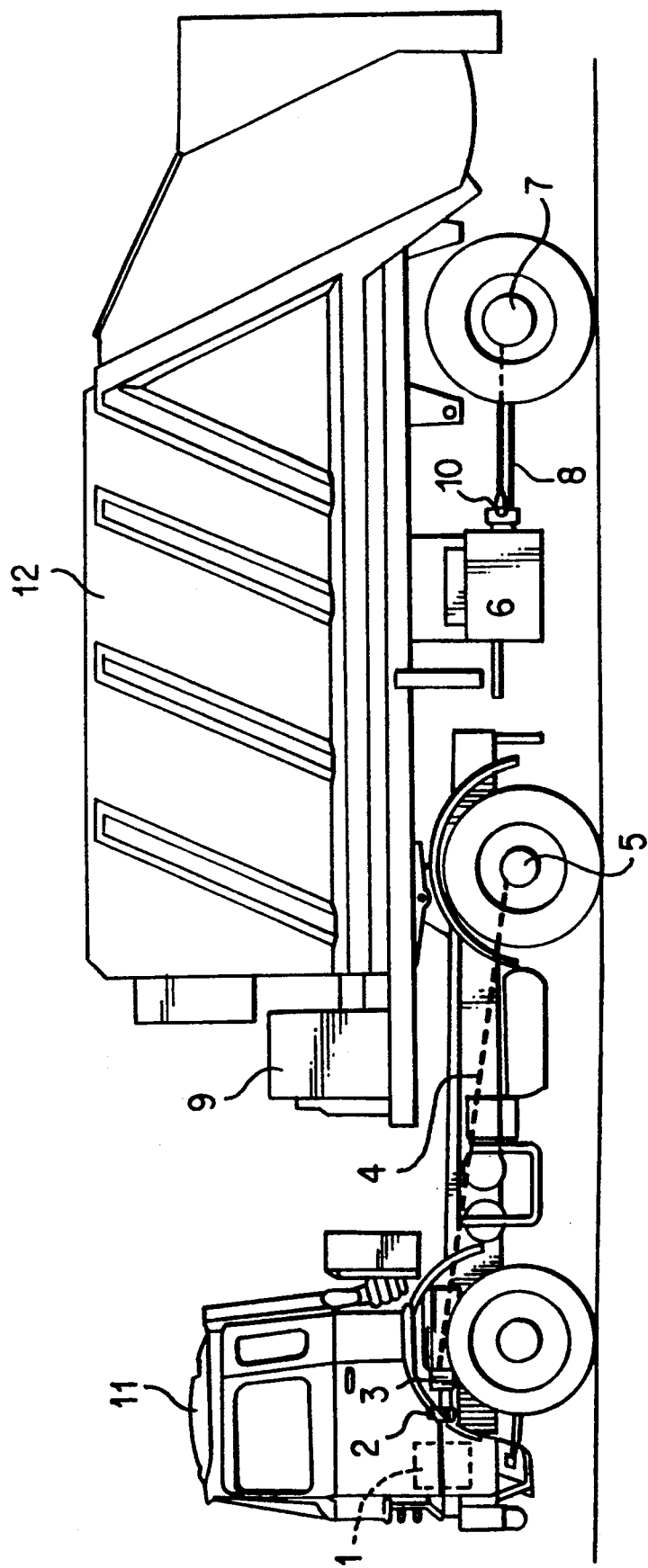
FIG. 1 is a schematic elevational view of a tractor and a semi-trailer for collecting household waste.

As shown in FIG. 1, in accordance with the invention, a tractor 11 is equipped with a thermal traction engine 1, a power transmission with clutch 2, gear box 3, cardan shaft 4 and a rear axle 5. The thermal energy is in the form of liquid fuel stored in a tank.

Furthermore, in accordance with the invention, the trailer 12 comprises a hauling compartment, an electric DC motor 6 and a power transmission between this motor and the rear axle 7 of the trailer by a cardan shaft 8. The electric energy is stored in a battery of accumulators 9. Since the electric energy is used essentially for collecting the urban waste, during which the speed of the vehicle is in any case reduced, and for some auxiliary functions which are mentioned below, the capacity which the battery must supply and thus its size remain compatible with an installation on board a vehicle, while providing sufficient independence of movement for the daily missions.

In one embodiment of a vehicle in accordance with the invention, a recharging device is provided for the batteries which provide the electric traction. This device comprises an electric machine, particularly an alternator or dynamo, driven by the thermal engine and a regulation system by means of which the output terminals of the electric machine are connected to the terminals of the battery. In a variant, this recharging device is designed so that the battery is recharged only partially during operation of the thermal engine, the charge being completed periodically from electric mains in the usual way.

Figure 2:
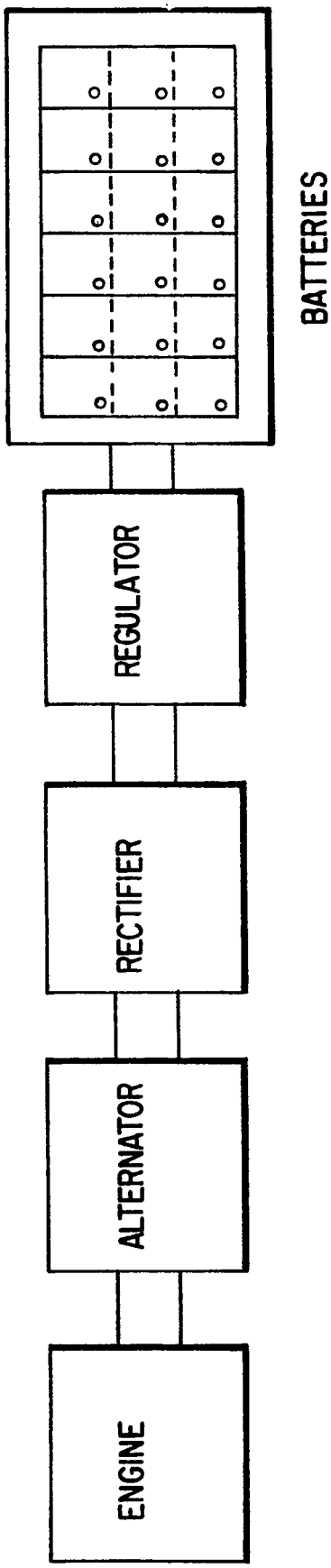
FIG. 2 is a schematic diagram of an electric battery recharging device.

FIG. 2 of the accompanying drawings shows schematically the recharging device in the case where the engine of diesel type drives an alternator which, through a rectifier and regulator, supplies the electric batteries.

In one embodiment, the payload of the dumper is 11080 kg, the thermal engine has a power of 173 kW (230 hp) and the electric motor has a power of 30 kW. The battery, formed of 48 2 V elements, namely a total voltage of 96 V, has a capacity of 650 to 1050 ampere-hours depending on the desired independent working time. Its weight is 2.8 to 4 tons and its size about 2.1×0.8×0.8 m. The vehicle may reach a maximum speed of about 34 km/hour under electric propulsion and about 100 km/hour under thermal traction.

The electric speed regulation of the DC motor(s) is well known, and transmission of power from the electric motor(s) requires no gear change box and friction clutch.

According to the invention, an electromagnetic clutch 10 is inserted for automatically uncoupling the electric motor when it is not switched on, and for coupling it to the rear axle 7 when it is switched on. During use of the electric motor, the gear box of the tractor is placed in neutral, for isolating the thermal engine, and electric or mechanical locking is provided for preventing the electric propulsion motor from being brought into service if the gear box is not in the neutral position.

In the embodiment above, the power and speed regulation takes place by means of an electronic device of the thyristor current chopping type, whose control mechanism is connected to the accelerator pedal of the tractor, so that the driving means remain the same whatever the energy used and the travel of the pedal corresponds at one and the same time to the power variation range of both the electric motor(s) and the thermal engine(s).

In accordance with the invention, arrangements are made so that the power assisted steering, the power assisted braking, compacting of the waste, signaling and other possible automatic controls are provided permanently, whatever the source of energy used (thermal engine or battery).

Thus, in the above embodiment, the vehicle is equipped with:

an air electro-compressor, of a power of 1.5 kW, fed electrically by the 96 V battery and delivering compressed air for pneumatic braking;

an oil electro-pump, power 1.2 kW, fed electrically by the 96 V battery and delivering the hydraulic fluid under a high pressure required for power assisted steering;

a control box, within reach of the driver, equipped with a "THERMAL-ELECTRIC" switch, a forward-rearward travel reverser for the electric propulsion, and the relays required for the above mentioned safety devices and functions;

a control box for the electric compacting motor.

The vehicle according to the invention is used as follows:

The travel between the garage and the place of collection takes place in the usual way, the propulsion being provided by the thermal engine. On arriving at the place where waste is to be collected, the driver places the gear box of the tractor in neutral, stops the thermal engine, then positions the "THERMAL-ELECTRIC" switch to "ELECTRIC" The electric motor starts up, the electromagnetic clutch is automatically engaged (if necessary with a time delay), and all the auxiliary functions remain available. The driver may then adjust the speed of the vehicle, from 0 to about 30 km/hour, by simple action on the accelerator pedal. At the end of the collection, he carries out the reverse operations to come back to thermal traction. The passage from one source of energy to the other is therefore extremely simple.

In the above embodiment, the vehicle travels over a distance on the road (in town) of 20 km in one hour and 15 minutes using thermal traction, and when collecting travels 14 km in four hours and 25 minutes using electric propulsion, the load collected being 9860 kg.

The vehicle is not necessarily of the semi-trailer type described above by way of example. It may have a single chassis fitted out as a truck, or be formed by a tractor and a trailer.

What is claimed is:

1. A composite road vehicle comprising:
  a tractor provided with first driving wheels and thermal driving means for providing power to the first driving wheels for propelling the composite road vehicle at a first traveling speed; and
  a collection and distribution trailer or semitrailer removably connected to said tractor, the trailer or semitrailer comprising a support structure; second driving wheels attached to said support structure; an electric power source of the battery type; electric driving means controlled from the cabin of the tractor for providing sufficient power to the second driving wheels for propelling the composite road vehicle, with the trailer or semitrailer connected to the tractor, at a second traveling speed lower than said first traveling speed; a transmission coupling said electric driving means to said second driving wheels; and a hauling compartment, attached to said support structure, with substantial available space over and above that occupied by the electric power source, electric driving means and transmission for collection and distribution of materials;

whereby, when the thermal driving means is disengaged and the electric driving means is engaged, the trailer or semitrailer propels the composite road vehicle at the second traveling speed for collection and distribution of materials, whereas when the electric driving means is disengaged and the thermal driving means is engaged, the tractor propels the composite road vehicle at the first traveling speed.

2. The vehicle of claim 1, wherein said electric driving means is operable with a lower power than said thermal driving means.

3. The vehicle of claim 1, wherein said electric driving means alone imparts to said vehicle a traveling speed of 10 to 50 km/hour, and said thermal driving means alone imparts to said vehicle a traveling speed of 60 to 120 km/hour.

4. The vehicle of claim 1, wherein available DC electric power of said electric power source is about 15 to 50 kW, and available thermal power of said thermal driving means is about 74 to 224 kW.

5. The vehicle of claim 4, wherein said available DC electric power of said electric power source is about 20 to 40 kW.

6. The vehicle of claim 1, wherein said electric driving means is operable at 1/10 to ½ of available thermal power of said thermal driving means.

7. The vehicle of claim 1, wherein said electric driving means is operable at 1/6 to ⅓ of available thermal power of said thermal driving means.

8. The vehicle of claim 1, further comprising an accelerator pedal in said tractor which controls both speed of said thermal driving means and speed of said electric driving means.

9. The vehicle of claim 8, wherein said accelerator pedal control speed of said electric driving means through an electronic device of the thyristor current chopping type.

10. The vehicle of claim 8, further comprising a gear box for said thermal driving means, and locking means for permitting operation of said electric driving means only when said gear box is in a neutral position.

11. The vehicle of claim 1, further comprising means driven by said thermal driving means for recharging said electric power source.

* * * * *